EDWARD N. McKIMM AND HOWARD W. BENDER, OF BENDERVILLE, PENNSYLVANIA.

Letters Patent No. 92,077, dated June 29, 1869.

IMPROVED FERTILIZING-COMPOUND.

The Schedule referred to in these Letters Patent and making part of the same.

*To whom it may concern:*

Be it known that we, EDWARD N. McKIMM and HOWARD W. BENDER, of Benderville, in the county of Adams, and State of Pennsylvania, have invented a new and useful Improvement in Fertilizing-Compounds; and we do hereby declare that the following is a full, clear, and exact description thereof, which will enable others skilled in the art to make and use the same.

This invention relates to a new and useful improvement in fertilizers, and consists in combining the ingredients hereinafter named in about the proportions set forth.

In carrying out our invention, we, in the first place, procure a floor or other suitable place, and put upon it one thousand pounds of earth, well sifted or screened from gravel or other foreign matter. This earth may be slightly dampened, and then spread upon the floor. Then add—

One hundred pounds of sulphate of ammonia,
One hundred pounds of common salt,
Twenty-five pounds of pearl-ash, and
Twenty-five pounds of sulphate of soda.

These ingredients are thoroughly mixed together, by stirring or raking, and when so mixed, add—

Four hundred pounds of ground bone.
Two hundred and twenty-five pounds of best Peruvian guano.
One hundred and fifty pounds of ground plaster.

Mix the whole thoroughly together. Then throw it into a heap and let it lie for forty eight hours, when it is fit for use.

The value of this compound as a fertilizer is not exceeded by any of the superphosphates in use, and scarcely by guano itself.

Having thus described our invention,

We claim as new, and desire to secure by Letters Patent—

The above fertilizing-compound, composed of the ingredients mentioned above, in about the proportions named, substantially as and for the purposes set forth.

EDWARD N McKIMM.
HOWARD W. BENDER.

Witnesses:
GEORGE BENDER,
GEORGE W. REX.